United States Patent [19]

Lambert, Jr.

[11] Patent Number: 5,406,871
[45] Date of Patent: Apr. 18, 1995

[54] COVER ASSEMBLY OF EXPANDED ELASTOMERIC TUBING HAVING FRANGIBLE SUPPORT CORE STRUCTURES

[75] Inventor: Robert L. Lambert, Jr., Georgetown, Tex.

[73] Assignee: Minnesota Mining and Manufacturing Company, St. Paul, Minn.

[21] Appl. No.: 740,311

[22] Filed: Aug. 5, 1991

[51] Int. Cl.$^6$ .............................................. F16L 9/14
[52] U.S. Cl. ....................................... 138/103; 138/99; 138/110; 138/177; 138/178; 29/450; 428/913
[58] Field of Search ................... 138/103, 99, 110, 177, 138/178; 29/235, 450, 423, 453; 174/DIG. 8; 428/913

[56] References Cited

U.S. PATENT DOCUMENTS

| | | | |
|---|---|---|---|
| 3,515,798 | 12/1968 | Sievert | 174/135 |
| 3,559,766 | 2/1971 | Heslop | 174/DIG. 8 |
| 4,035,534 | 7/1977 | Nyberg | 428/36 |
| 4,070,746 | 1/1978 | Evans et al. | 29/450 |
| 4,179,320 | 12/1979 | Midgley et al. | 138/103 |
| 4,206,786 | 6/1980 | Wetmore | 138/178 |
| 4,287,012 | 9/1981 | Midgley et al. | 174/DIG. 8 |
| 4,338,970 | 7/1982 | Krackeler et al. | 138/103 |
| 4,389,440 | 6/1983 | Keith | 29/450 |
| 4,410,009 | 10/1983 | Blum | 138/109 |
| 4,496,616 | 1/1985 | McLoughlin et al. | 174/DIG. 8 |
| 4,579,148 | 4/1986 | Sovish et al. | 174/DIG. 8 |
| 4,585,607 | 4/1986 | Krackeler et al. | 264/269 |
| 4,656,070 | 4/1987 | Nyberg et al. | . |
| 4,717,608 | 1/1988 | Meltsch | 174/DIG. 8 |
| 4,871,599 | 10/1989 | Knorr | 29/235 |
| 4,952,437 | 8/1990 | Winterhoff et al. | 174/DIG. 8 |

FOREIGN PATENT DOCUMENTS 2018527 4/1979 United Kingdom .

Primary Examiner—James E. Bryant, III
Attorney, Agent, or Firm—Gary L. Griswold; Walter N. Kirn; David W. Anderson

[57] ABSTRACT

A cover assembly includes an expanded elastomeric tube supported in the expanded state by an internal frangible support core. The support core possesses sufficient strength to resist contraction of the tube but will break upon the addition of relatively little additional external force. Breakage of the core allows the tube to contract and securely cover and seal to the object to which the cover assembly is applied.

10 Claims, 2 Drawing Sheets

COVER ASSEMBLY OF EXPANDED ELASTOMERIC TUBING HAVING FRANGIBLE SUPPORT CORE STRUCTURES

FIELD OF THE INVENTION

The invention relates to expanded (radially stretched) elastomeric tubing which is retained in the expanded condition by a rigid core prior to use.

BACKGROUND OF THE INVENTION

One method of environmentally protecting and/or electrically insulating an object is by providing an expanded elastomeric tube which is maintained in the expanded condition, positioned over the object to be protected and then allowed to contract into intimate contact with the object. "Expanded condition" as used herein refers to radial stretching of the elastomeric tubing, but not significant longitudinal stretching. Such tubing finds particularly useful application in the electrical industry where it is used to cover, environmentally protect and electrically insulate electrical connections, such as splices between two electrical conductors.

There are several methods of maintaining elastic tubes in the expanded condition prior to application. These methods usually involve the use of a rigid support structure which has dimensions greater than the dimensions of the elastic tube in an unstretched condition. Suitable support structures may be positioned inside or outside the expanded tube to firmly hold the tube in an expanded condition.

U.S. Pat. No. 3,515,798, assigned to the assignee of the present invention, is hereby incorporated by reference and discloses an internal support for an expanded elastomeric tube in the form of a continuous narrow strip of tough flexible material in the form of a substantially rigid closed helix having adjacent coils interconnected. This helical internal support is removed by pulling one end of the strip of material and thereby unwinding and removing the internal support to allow the tube to contract.

U.S. Pat. Nos. 4,585,607; 4,070,746 and 4,656,070 disclose expanded elastomeric tubes which are retained in an expanded condition by an external form to which the expanded tube is bonded. The external form is separated from the expanded tube either by chemically weakening the bond between the form and the tube or breaking the form and peeling it away from the tube.

The problem associated with any of the prior patents described above is disposal of the retaining device or its remnants.

SUMMARY OF THE INVENTION

The above-mentioned problem of disposal of the retaining device for an expanded core is solved in accordance with the present invention by providing an expanded elastomeric tube with an internal support of a frangible material and structure which may be broken into pieces or shards which will not substantially prevent the tube from contracting to provide its protective function. All or most of the pieces of the once-supportive core will be retained within the contracted elastomeric tube and thus need not be the subject of subsequent disposal.

It is possible to fabricate the support core, and thus the expanded elastomeric tube, in basic cylindrical tubular forms as well as shapes of more complex geometry. It is important that the support core structure be strong enough to maintain the elastomeric tube in an expanded condition and not collapse prematurely. Also it is necessary that the support structure collapse upon application of sufficient, but not excessive, external pressure to the tube beyond that exerted by the expanded tube itself. Upon breakage of the core, the tube then shrinks or recovers so that it approaches its original dimensions. In addition, for purposes of this invention, it is preferred that the frangible structure disintegrate, producing many small fragments of the original support structure. The smaller the fragments, the easier will be their accommodation within the contracted tube.

Accommodation of the crushed core fragments is an important feature of this invention. Because of this feature there are no surplus materials which need disposal after a product of this invention, e.g. a shrinkable tube, has been installed. By way of example, a shrinkable tube may be used, in a typical application, to insulate and environmentally seal a bare wire connection or splice which is part of an electrical circuit or wire harness. In the simplest case, an expanded cylindrical structure or tube of this invention is positioned around the bare wire junction formed by connecting the metal cores of two insulated wires. Sufficient pressure is then applied to the outer surface of the expanded tube to cause the frangible support structure or core to break and allow the elastomeric tube to shrink towards and surround the wire junction.

Selection of the expanded tube for this application must consider the volume occupied by the wire junction and the available volume inside the tube after shrinking. For correct application it should not be possible for the tube to recover to its original dimensions. Rather it is desirable that the installed tube continue to be under some tension so that it fits snugly over the wire junction and exerts pressure against the wire junction. This is desirable so that core fragments are firmly held within the tube, environmental contaminants are denied access and the wire junction is effectively insulated.

Core fragments, from a collapsed core, must be as small as possible to facilitate accommodation within the conformable tube. If the fragments are too large it will be difficult to prevent gaps between the wire junction and the inner surface of the tube. Such gaps may be sufficient to allow fluids to penetrate the protective tube. A variety of core wall structures have been investigated to keep the size of collapsed core fragments to a minimum. In some cases the wall of the core may be formed as a continuous structure, while in others the walls are discontinuous, lattice-like or perforated. These open-walled structures provide additional free space for the accommodation and retention of crushed core fragments.

Retention of the fragments may be further improved by coating the inner surface of the support structure with a semi-fluid adhesive or sealant material. When the core is crushed this inner coating will flow around the core fragments to hold them in place and seal off any void space. Thus a multilayer structure may be advantageous. Other layers which may be incorporated in the structures of this invention include those which provide electromagnetic or electrical shielding, dielectric stress control or are electrically conductive.

BRIEF DESCRIPTION OF THE DRAWINGS

The present invention will be more particularly described with respect to the accompanying drawings, wherein like numbers refer to like parts in the several views, and wherein.

DETAILED DESCRIPTION OF THE INVENTION

Figure 1:
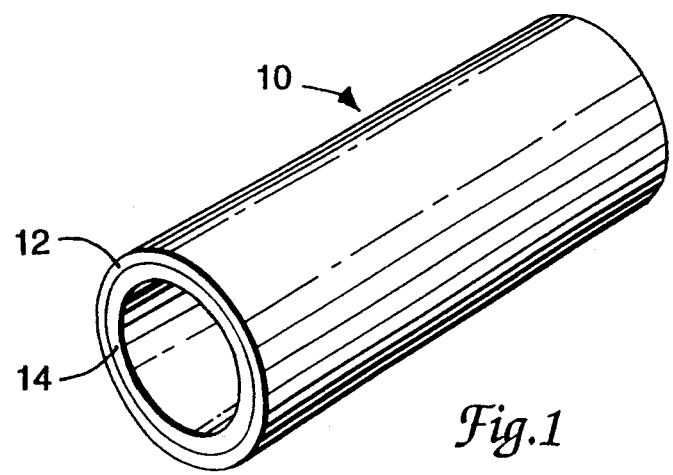
FIG. 1 is a perspective view of an expanded elastomeric tube and internal support core according to the present invention.

FIG. 1 illustrates a cover assembly of the present invention, generally indicated as 10, which includes an outer tube 12 and a frangible, inner support core structure 14. The tube 12 is made of a flexible, elastic material which may be stretched to several times its original dimensions and recover to its original size and shape, or substantially so, when the stretching force is released. Some suitable materials are described in U.S. Pat. No. 3,515,798 incorporated herein by reference. No restriction is anticipated on the chemical nature of the tube 12 material except that it must possess elasticity which allows it to be stretched then shrink to its original dimensions. Rubbery elastomers such as natural rubber, synthetic rubber, silicone polymers and similar materials may be used in the form of expandable tubes 12 for the present invention. Preferred materials are ethylene-propylene-diene monomer terpolymers (EPDM). These materials may be formulated to a variety of compositions which exhibited differences in expansion and ability to recover.

The core 14 of FIG. 1 is a continuous-walled cylindrical tube. A distinguishing feature of this core 14 of the invention is its ability to collapse on demand by breaking. This feature is achieved by adjusting the composition and the wall thickness of the core. When these properties are correctly selected it will be possible for the core to withstand the recovery forces exerted by an elastic tube 12 yet, by the application of relatively little additional pressure, readily collapse and disintegrate. The support core 14 of FIG. 1 comprises a brittle resin which may be filled with a variety of particulate materials. Suitable resins may be selected from the general classes of polystyrenes, polyesters and polyacrylates. Preferred brittle resin components include rapid cure (4 to 5 minutes) epoxy resins, amine cured, two-part epoxies, transparent styrene polyester resins and solvent soluble acrylate resins. Unfilled resin cores 14 in useful wall thicknesses were not found to be sufficiently inflexible to maintain the shape of expanded elastic tubes 12. It is, therefore, believed necessary to incorporate reinforcing fillers such as fibers, flakes, microbubbles or microbeads, before the core 14 is formed. The fillers improve strength and deformation resistance. They also facilitate crack propagation within a collapsing core 14.

As an alternative to filled resin cores 14 it has been demonstrated that thin-walled ceramic forms may also be used as collapsible-on-demand support structures. Considering all types of materials, including thermoplastic resins, thermoset resins, glasses and ceramic materials which are useful as core 14 materials, the preferred continuous resin phase comprises a two-part epoxy which is cured and cross linked with a poly functional amine curing agent, with the preferred composition of the core 14 structure being this resin filled with microbeads in the range of 50 to 60 micrometers in diameter and a 1:1 ratio by volume of beads to resin. Ratios below approximately 1:2 render the core too flexible and ratios above approximately 2:1 render the core 14 too brittle to support the tube 12. Microbeads in the diameter range of 20-100 micrometers have been found effective, but the range described above is preferred.

The ability of the core 14 to collapse on demand is linked to the careful selection of resin and filler components which comprise the core 14. It is possible to provide alternative collapsible cores which rely upon the design of the wall structure for their frangibility. FIGS. 2 through 7 are representative of supporting cores, 16 through 26 respectively, of this invention, which have specially designed wall portions. The design features included in the walls facilitate either the rate of collapse of the core 16-26 or the size, shape and/or uniformity of the fragments produced on disintegration.

Figure 2:
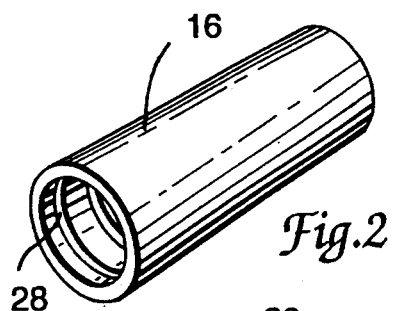
FIGS. 2-12 are perspective views of additional embodiments of the support core of the invention of FIG. 1.

The core 16 of FIG. 2 is provided with a longitudinal helical groove 28 inscribed on the interior surface of the core 16. The wall at the inscribed helix 28 is relatively thinner than the rest of the core 16. The portion at the helix 28 is thus relatively weaker than other parts of the core 16. When pressure is applied to this type of core 16, the resulting strain is relieved through the helical groove 28 where crack propagation and core 16 collapse is initiated. As expected, fragments of the collapsed core 16 reflect the shape of a helix. A core 16 designed as in FIG. 2 provides a support core 16 structure which propagates cracks longitudinally but does not necessarily produce the desired small fragments.

Figure 3:
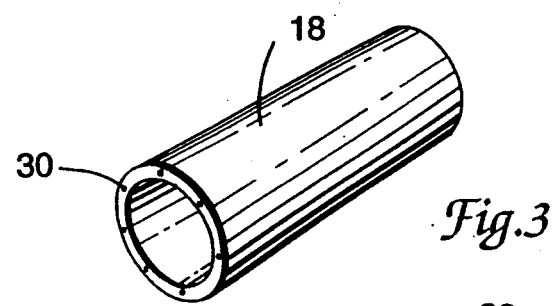

In a similar fashion the support core 18 of FIG. 3 encourages longitudinal crack propagation within the stressed structure. Either monofilament or multifilament fibers 30 embedded lengthwise at points around the circumference of the core 18 help to maintain the integrity of the core 18 until pressure is applied. Upon distortion the core 18 will collapse effectively via crack development along the length of the embedded fibers 30. Once again there is, in this case, little control of core fragment size.

Figure 4:
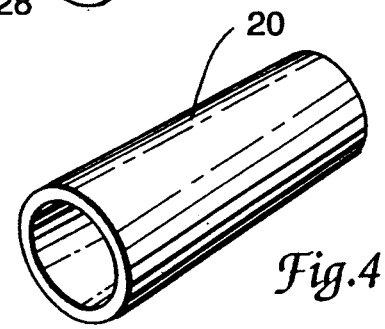

FIG. 4 depicts a resin core 20 which utilizes randomly distributed fibers 32 to reinforce the core 20 when the core 20 is used in the static state to only support the tube 12, but provides crack initiation and propagation sites when it is desired and enough force is applied to collapse the core 20. After breakage, the web 32 also acts to connect the core 20 pieces and help retain them within the tube 12. This core 20 may be produced by impregnating a non-woven web with a suitable resin and thereafter forming the tubular support core 20. The fibers 32, thus incorporated in the core 20, are of relatively long length.

Figure 5:
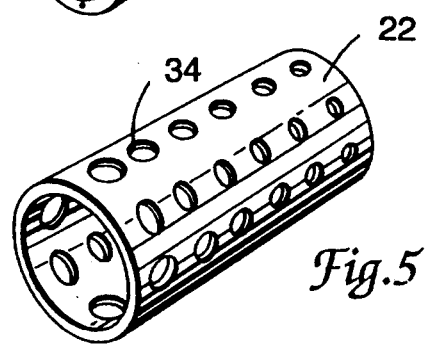
Figure 6:
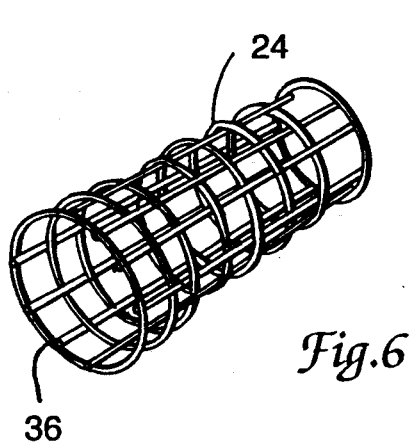
Figure 7:
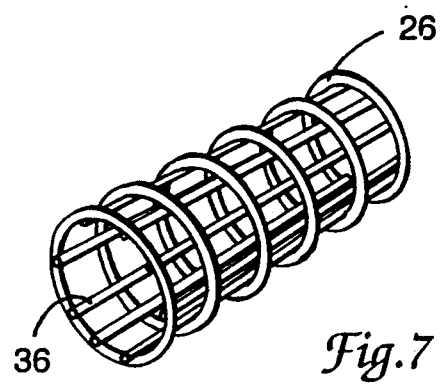
Figure 8:
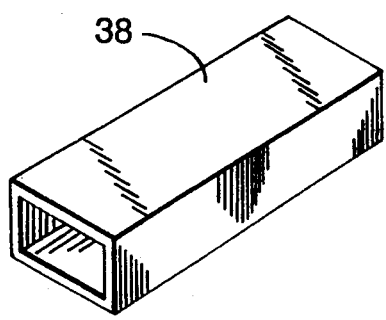
Figure 9:
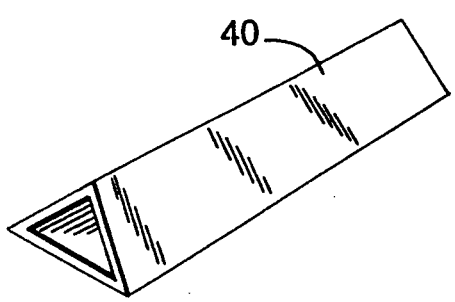
Figure 10:
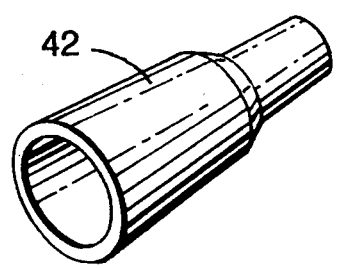
Figure 11:
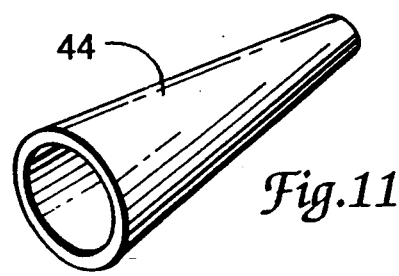
Figure 12:
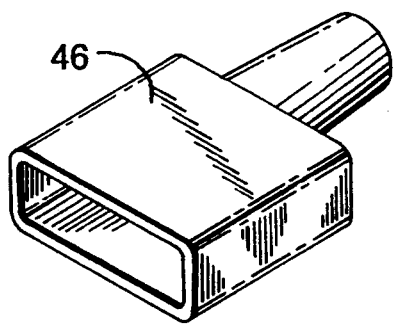

The design of support cores 22-26 shown in FIG. 5 through 7 offer the most control over the size of the fragments generated when the core 22-26 breaks. Support core 22, FIG. 5, incorporates voids 34 which may vary in shape and dimension. The core 22 of FIG. 5 shows a perforated core 22 containing circular voids 34. FIGS. 6 and 7 illustrate support cores 24 and 26 which have a woven-fiber (FIG. 6) or fiber overlay (FIG. 7) structure. These cores 24 and 26 are constructed using resin-impregnated, multi-filament thread 36. Monofilament thread has usually been found to render the cores 24 and 26 too flexible to be of use in the present application, although the use of brittle monofilaments such as glass filaments might be useful. The presence of voids within and around the thread 36 causes points of weakness in the support cores 24 and 26. Under pressure the cores 24 and 26 relieve stress via failure at multiple sites. The resin-coated thread 36 structures have been observed to collapse by folding and breaking at points of weakness rather than fiber fracture. Another advantage of the open weave core 22, 24 or 26 is the value of the void space which provides a volume to accommodate the wall fragments during collapse.

The previous description of the cover assembly 10 has focused on the simple form of a cylindrical tube. Other forms are equally useful and may be supported on cores 38-46 illustrated by way of example in FIGS. 8 through 11.

Figure 13:
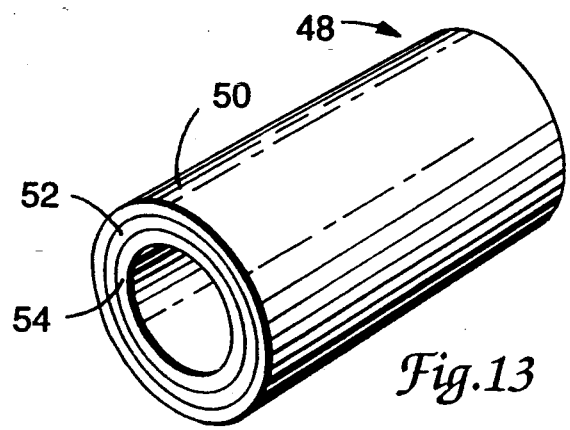
FIG. 13 is a perspective view of an alternate embodiment of the elastomeric tube, its support core and an additional, internal layer.

Containment of the fragments of a disintegrating core 14-46 may be facilitated by including a fluid, frequently insulative, viscous sealant material as part of the support structure. The resulting design includes multiple layers. FIG. 13 shows a typical multilayer cover assembly 48 structure. In this case the expanded elastic tube 50 is supported on a frangible cylindrical core 52 which may be any of the designs previously discussed. The inside surface of the core 52 is coated with a layer of mastic or other suitable viscous material 54. This multilayer tubular structure may be positioned, for example, over an electrical wire connection and pressure applied, causing the core 52 to collapse. As the elastic tube 50 recovers, it exerts pressure on the sealant 54. This sealant 54 in turn engulfs the wire connection preventing ingress of unwanted contaminants. Simultaneously the sealant 54 flows around the fragments generated by the collapsing core 52. The sealant 54 then serves to fill the void space which exists around the wire connection and confine the core 52 fragments, sealing them against the inner surface of the elastic tube 50. Ultimately the wire connection is insulated and effectively sealed off from any environmental contamination.

The properties of the sealant layer 54 may be modified by incorporation of functional materials. For instance, by careful selection of the concentration of a range of conductive or semi-conductive particulates it is possible to provide sealant layers 54 which possess a variety of desirable attributes. Sealant layers useful for insulating, controlling dielectric stress and shielding have been demonstrated. A number of layers having different desirable properties may be incorporated within the core 52 beyond the one layer illustrated in FIG. 13.

Cover assemblies have to date been constructed manually by spirally winding release paper on a mandrel and coating the paper with core material. The cured tubular core structure may be removed from the mandrel, the release paper removed and covered by the elastomeric tube by stretching the tube with grippers such as pliers, or the elastomeric tube may be stretched over the core while the core is in place on the mandrel. The structure pieces may be cut to length before or after removal from the mandrel and either as an assembly or individually. It is anticipated that more automated construction will be possible.

The present invention has thus been described with respect to a number of embodiments. However, alternative means for carrying out the invention will suggest themselves to one skilled in the art. For example, the outer expandable tube 12 of FIG. 1 is shown trimmed to the same length as the support core 14. In some applications it may be beneficial to vary the length of the tube 12, allowing it to extend beyond one end or both ends of the core to more completely contain the broken fragments of the core 14 and seal more securely to the object covered. In addition, when especially brittle cores are used, it may be necessary to dimension the parts so that the core extends beyond the ends of the tube. Otherwise the tube may cause premature collapse of the core by progressively crumbling the core ends.

I claim

1. A cover assembly comprising:
    a stretchable, elastomeric tube capable of recovering at least a portion of its original size and shape after being stretched and released; and
    a frangible inner support core of epoxy resin including a filler of microbeads, said core being sized and possessing sufficient strength to support said tube in a radially stretched condition, said core further being susceptible to breaking upon the application of force beyond that produced by said tube, so that the application of sufficient force causes breakage of said core, thus permitting contraction of said tube.

2. The cover assembly of claim 1 wherein said microbeads have a diameter in the range of approximately 20 to 100 micrometers.

3. The cover assembly of claim 2 wherein said microbeads have a diameter in the range of approximately 50 to 60 micrometers.

4. The cover assembly of claim 3 wherein said microbeads and said epoxy resin are in a volume ratio of between approximately 1:2 and 2:1 microbeads to resin.

5. The cover assembly of claim 4 wherein said ratio of microbeads to resin is approximately 1:1.

6. A cover assembly comprising:
    a stretchable, elastomeric tube capable of recovering at least a portion of its original size and shape after being stretched and released; and
    a frangible inner support core of brittle resin including a filler of microbeads, said core being sized and possessing sufficient strength to support said tube in a radially stretched condition, said core further being susceptible to breaking upon the application of force beyond that produced by said tube, so that the application of sufficient force causes breakage of said core, thus permitting contraction of said tube.

7. The cover assembly of claim 6 wherein said microbeads have a diameter in the range of approximately 20 to 100 micrometers.

8. The cover assembly of claim 6 wherein said microbeads have a diameter in the range of approximately 50 to 60 micrometers.

9. The cover assembly of claim 8 wherein said microbeads and said epoxy resin are in a weight ratio of between approximately 1:2 and 2:1 microbeads to resin.

10. The cover assembly of claim 9 wherein said ratio of microbeads to resin is approximately 1:1.

* * * * *